(12) United States Patent
Sweeney et al.

(10) Patent No.: US 9,151,605 B1
(45) Date of Patent: Oct. 6, 2015

(54) BEVERAGE CONTAINER CAP

(71) Applicants: Gerald Sweeney, La Jolla, CA (US);
Cory McCluskey, Encinitas, CA (US);
James Pfeiffer, Los Gatos, CA (US)

(72) Inventors: Gerald Sweeney, La Jolla, CA (US);
Cory McCluskey, Encinitas, CA (US);
James Pfeiffer, Los Gatos, CA (US)

(73) Assignee: IQHYDR8, LLC, San Diego, CA (US)

( * ) Notice: Subject to any disclaimer, the term of this patent is extended or adjusted under 35 U.S.C. 154(b) by 0 days.

(21) Appl. No.: 14/305,537

(22) Filed: Jun. 16, 2014

(51) Int. Cl.
*G01C 9/04* (2006.01)
*B65D 47/26* (2006.01)

(52) U.S. Cl.
CPC . *G01C 9/04* (2013.01); *B65D 47/26* (2013.01); *B65D 2543/00055* (2013.01)

(58) Field of Classification Search
CPC ............. G01C 9/04; G01C 9/00; G01C 9/18; G01C 2009/102; G01C 9/02; G01C 2009/062; G01C 2009/064; G01C 2009/066; B65D 47/26; B65D 2543/00055
USPC .................... 220/703, 711, 714, 202, 203.01, 220/203.23, 203.04, 212, 303, 710.5, 713; 215/387, 260, 311, 315, 307; 206/217; 702/154; 340/573.1, 686.1
See application file for complete search history.

(56) References Cited

U.S. PATENT DOCUMENTS

| | | | |
|---|---|---|---|
| 3,964,631 A * | 6/1976 | Albert | 220/715 |
| 4,099,642 A | 7/1978 | Nergard | |
| 6,062,419 A | 5/2000 | Kruger et al. | |
| 6,990,860 B1 | 1/2006 | Gillanders | |
| 7,011,227 B2 | 3/2006 | Ward et al. | |
| 7,020,508 B2 | 3/2006 | Stivoric et al. | |
| D547,607 S | 7/2007 | Forsman | |
| 7,416,093 B2 * | 8/2008 | Lin et al. | 220/254.5 |
| D584,566 S | 1/2009 | Fuller | |
| D586,184 S | 2/2009 | Miller et al. | |
| D592,913 S | 5/2009 | Pinelli et al. | |
| 7,783,344 B2 | 8/2010 | Lackey et al. | |
| D652,256 S | 1/2012 | Eyal | |
| D656,787 S | 4/2012 | Phillips et al. | |
| D657,618 S | 4/2012 | Wahl | |
| D675,059 S | 1/2013 | Carreno | |
| 8,360,267 B1 | 1/2013 | Chiou et al. | |
| 8,378,830 B2 | 2/2013 | Moran | |

(Continued)

FOREIGN PATENT DOCUMENTS

EP 1292218 A1 3/2003
EP 2472488 A1 7/2012

OTHER PUBLICATIONS

Hydrachoach, Hydration Monitors, www.hydracoach.com, 2004, 2 pages.

(Continued)

*Primary Examiner* — Robert J Hicks
*Assistant Examiner* — Kareen Thomas
(74) *Attorney, Agent, or Firm* — ARC IP Law, PC; Joseph J. Mayo

(57) ABSTRACT

A cap for use with a beverage container comprising a housing that attaches to a beverage container, the housing comprising an opening for dispensing the contents of the beverage container and further comprising a valve activated by a valve button. A sensor within the housing estimates the amount of a fluid that has been dispensed from the opening and a display device is provided for displaying the amount of fluid that has been dispensed from the opening. The display device may be any type of display, including an LED display, and LCD display, or a plurality of indicator lights.

14 Claims, 10 Drawing Sheets

(56) References Cited

U.S. PATENT DOCUMENTS

| | | | |
|---|---|---|---|
| 8,397,940 | B2 | 3/2013 | Steininger |
| D679,541 | S | 4/2013 | Samartgis |
| 8,574,165 | B2 | 11/2013 | Marsh |
| D696,073 | S | 12/2013 | Miller et al. |
| 8,602,238 | B2 | 12/2013 | El-Saden et al. |
| 8,611,992 | B2 | 12/2013 | Goldstein et al. |
| D700,012 | S | 2/2014 | Hurley et al. |
| 8,734,341 | B2 | 5/2014 | Howell et al. |
| D707,124 | S | 6/2014 | Blain et al. |
| D707,492 | S | 6/2014 | George et al. |
| 2005/0115977 | A1 | 6/2005 | Dibdin et al. |
| 2006/0231109 | A1 | 10/2006 | Howell et al. |
| 2007/0048224 | A1 | 3/2007 | Howell et al. |
| 2008/0089993 | A1 | 4/2008 | Hwang et al. |
| 2009/0080180 | A1 | 3/2009 | Bertken |
| 2009/0250480 | A1 | 10/2009 | Pinelli |
| 2011/0036801 | A1 | 2/2011 | Krans et al. |
| 2011/0050431 | A1 | 3/2011 | Hood et al. |
| 2011/0309095 | A1 | 12/2011 | Pinelli |
| 2012/0037651 | A1 * | 2/2012 | Steuer .......................... 220/714 |
| 2012/0094261 | A1 | 4/2012 | Hayn et al. |
| 2012/0259180 | A1 | 10/2012 | Rock |
| 2013/0319915 | A1 | 12/2013 | Gellibolian et al. |
| 2014/0182952 | A1 | 7/2014 | Yuen et al. |
| 2014/0221788 | A1 | 8/2014 | Teller et al. |
| 2014/0221792 | A1 | 8/2014 | Miller et al. |
| 2014/0249388 | A1 | 9/2014 | Howell et al. |
| 2014/0311239 | A1 | 10/2014 | Marjanovic et al. |

OTHER PUBLICATIONS

Hydracoach, Hydracoach Intelligent Water Bottle User Guide, 2007, 14 pages.

Kickstarter, "Track your water intake and Hydrate better with The Hug", 2014, 16 pages.

Vessyl Design, Faq page, 2014, 7 pages.

Contigo, Innovation Web Page, www.gocontigo.com, 2015, 3 pages.

CafePress Travel Mug, Web Page, http://www.cafepress.com/+mugs?cat=203071, 2015, 2 pages.

* cited by examiner

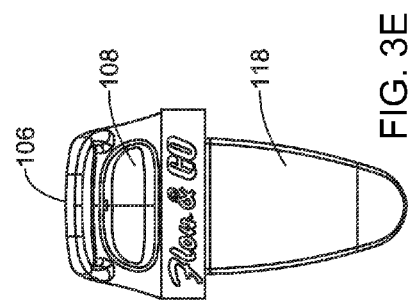
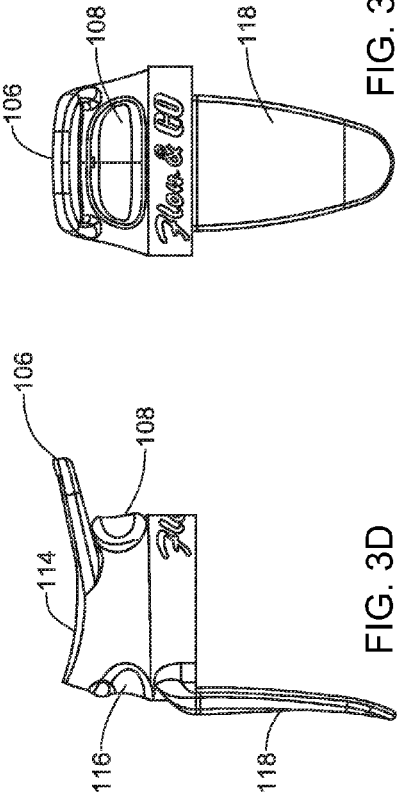
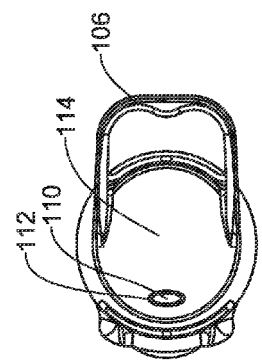
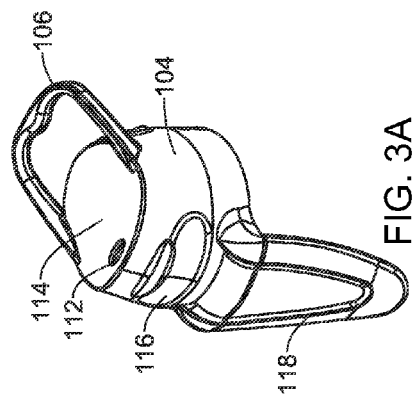
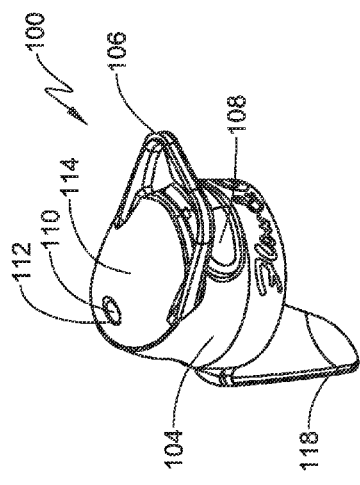

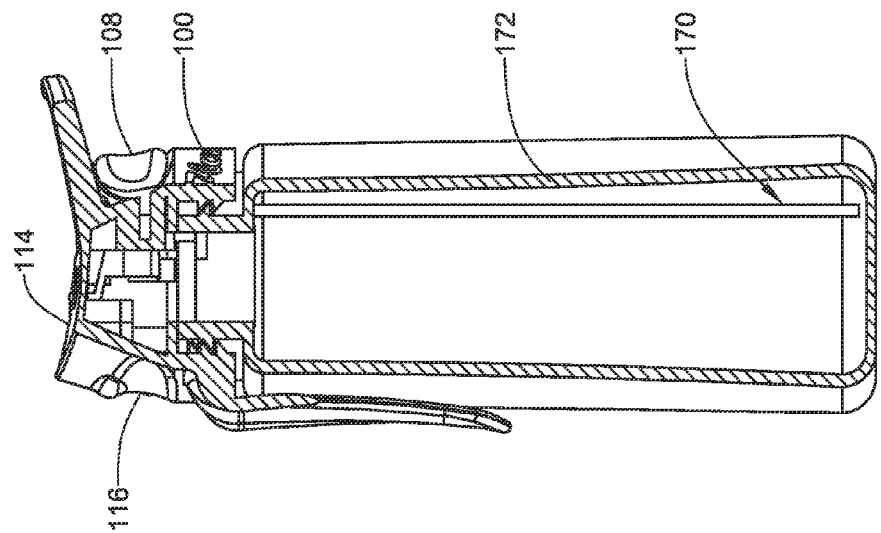
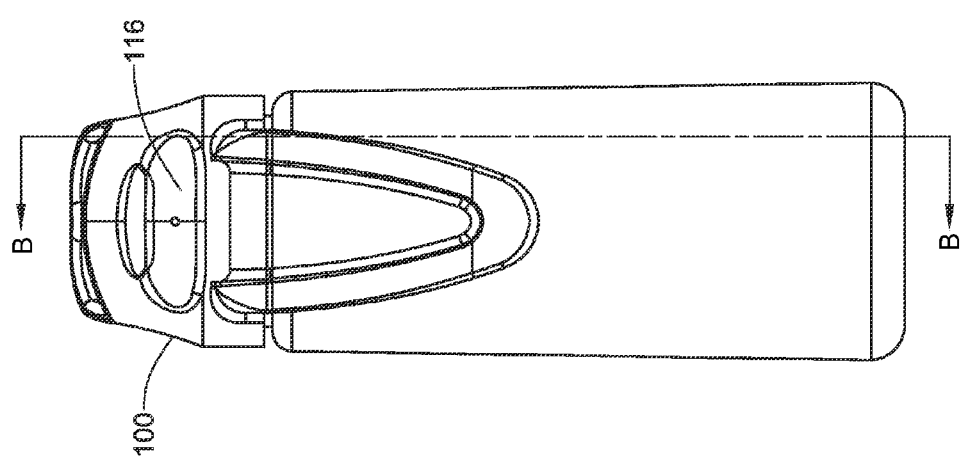
FIG. 8B
FIG. 8A

BEVERAGE CONTAINER CAP

This is a continuation-in-part of application Ser. No. 13/780,145, filed Feb. 28, 2013, which is hereby incorporated by reference in its entirety as if set forth herein, and which is a continuation-in-part of Application Ser. No. 29/446,761, filed Feb. 27, 2013, which is hereby incorporated by reference in its entirety as if set forth herein.

BACKGROUND OF THE INVENTION

1. Field of the Invention

The invention relates generally to the field of beverage container caps and containers. In particular, the invention relates to a reusable, washable cap that can be used with a variety of different beverage containers.

2. Description of Related Art

The prior art includes reusable water bottles and other insulated and non-insulated beverage containers with removable caps of various types. Such beverage containers come in a huge variety of styles and configurations with caps ranging from simple threaded lids that must be completely removed to drink the beverage, to complex systems with straws, valves, and other mechanisms. Existing systems, however, have failed to meet the need for a beverage container and cap that is easy to carry, easy to use without unwanted spillage, and dishwasher safe. Existing beverage containers have further failed to meet the need to provide users with useful information during use of the container as part of various activities such as walking, hiking, biking, etc.

The present invention overcomes these problems, providing a dishwasher safe cap for a beverage container that can be carried by hand or securely attached to a belt, garmet, or bag, with a simple, reliable valve. The cap can be equipped with various sensors and output devices that provide a range of useful information to the user.

SUMMARY OF THE INVENTION

In various exemplary embodiments, the invention comprises a cap for use with a beverage container comprising a housing that attaches to a beverage container, the housing comprising an opening for dispensing the contents of the beverage container and further comprising a valve activated by a valve button. A sensor located within the housing estimates the amount of a fluid that has been dispensed from the opening and a display device is provided for displaying the amount of fluid that has been dispensed from the opening. The display device may be any type of display, including an LED display, and LCD display, or a plurality of indicator lights. The cap may further include a tilt sensor within the housing that activates a timer only when the beverage container is tilted in an orientation for drinking. In various exemplary embodiments, the sensor located with the housing is a switch that is opened or closed when the valve is activated and a timer controlled by the switch may determine the amount of time the valve is activated. The amount of fluid dispensed from the beverage container may be determined based on the amount of time the valve is activated and the average flow rate out of the opening in the cap.

BRIEF DESCRIPTION OF THE DRAWINGS

FIG. 3A is perspective view of an exemplary embodiment of a container cap in accordance with the present invention.

FIG. 3B is an alternate perspective view of an exemplary embodiment of a container cap in accordance with the present invention.

FIG. 3C is a top view of an exemplary embodiment of a container cap in accordance with the present invention.

FIG. 3D is a side view of an exemplary embodiment of a container cap in accordance with the present invention.

FIG. 3E is a front view of an exemplary embodiment of a container cap in accordance with the present invention.

FIG. 8A is a front view of an exemplary embodiment of a container cap in accordance with the present invention attached to a bottle.

FIG. 8B is a section B-B view of an exemplary embodiment of a container cap in accordance with the present invention attached to a bottle.

DESCRIPTION OF EXEMPLARY EMBODIMENTS OF THE INVENTION

Figure 1:
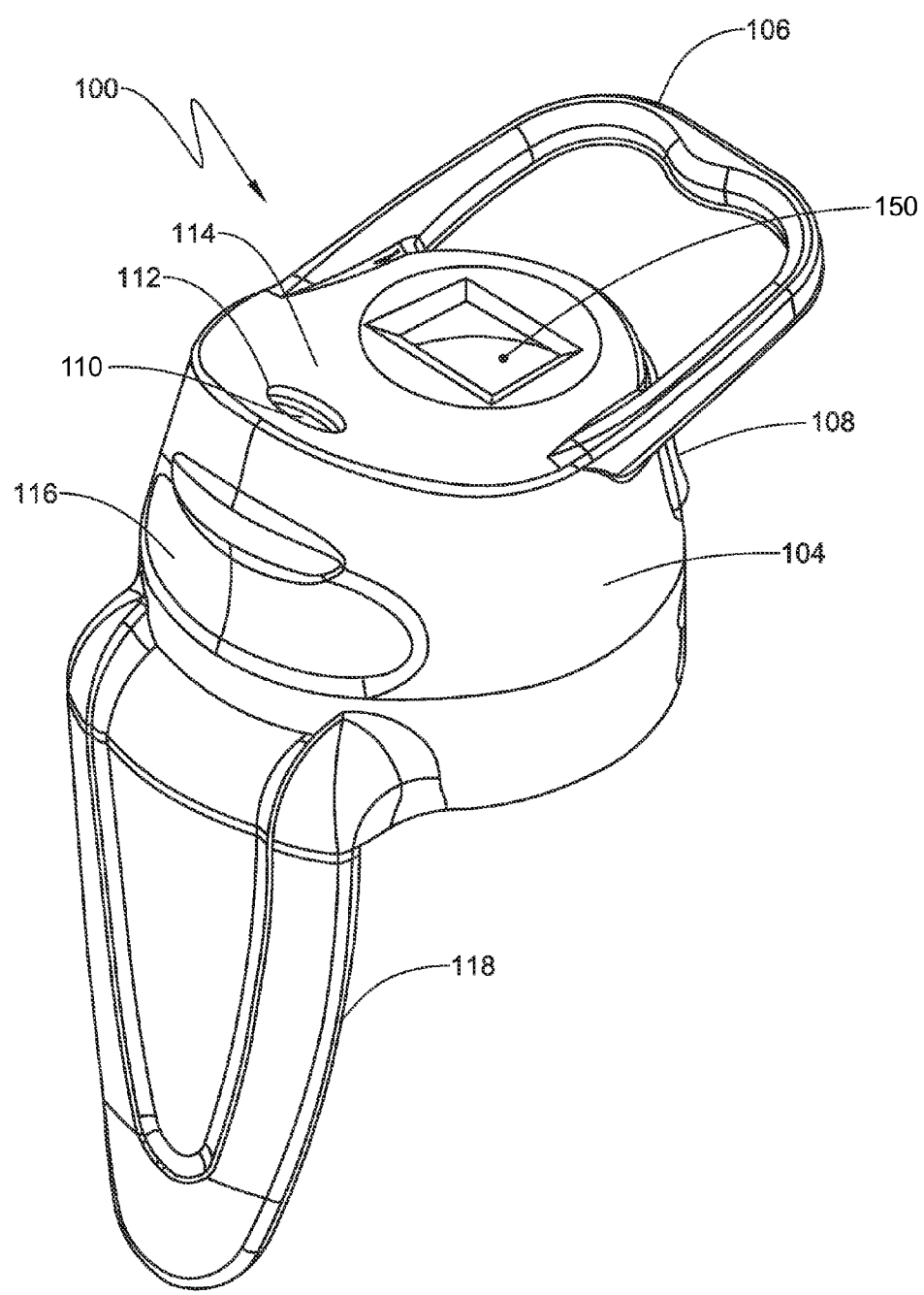
FIG. 1 is a perspective view showing an exemplary embodiment of the beverage container cap described herein.
Figure 2B:
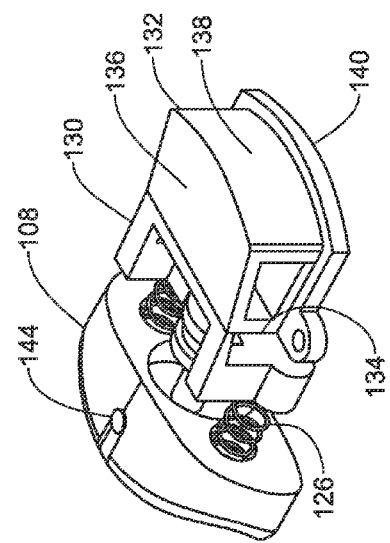
FIG. 2B is perspective view of an exemplary embodiment of a valve button, actuator and valve sealing mechanism in accordance with the present invention.
Figure 2C:
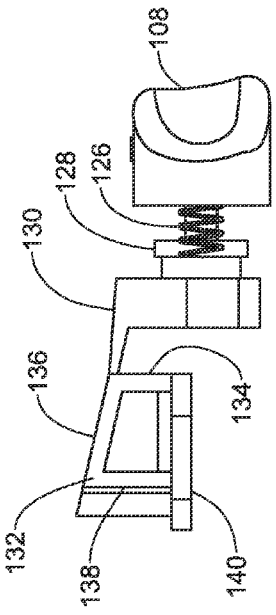
FIG. 2C is side view of an exemplary embodiment of a valve button, actuator and valve sealing mechanism in accordance with the present invention.
Figure 2A:
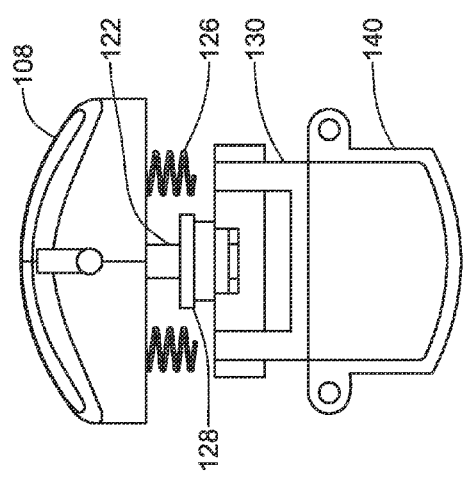
FIG. 2A is top view of an exemplary embodiment of a valve button, actuator and valve sealing mechanism in accordance with the present invention.
Figure 2D:
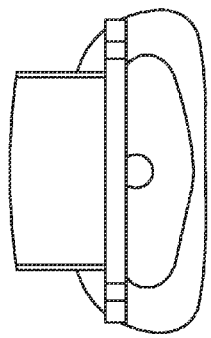
FIG. 2D is front view of an exemplary embodiment of a valve button, actuator and valve sealing mechanism in accordance with the present invention.

The following description is presented to enable any person skilled in the art to make and use the invention. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

Referring to the accompanying drawings, in an exemplary embodiment of the invention a cap 100 attaches to a beverage container by means of threads 102 that engage complimentary threads on the beverage container. It will be understood that other systems and structures can be used to attach the cap to the beverage container, such as elastomeric seals, snap fit connections, etc. Any such attachment that provides a secure, fluid-tight seal between the beverage container and cap may be used. Moreover, cap 100 can be used with any type of beverage container having any shape, configuration, or construction and including without limitation steel and plastic water bottles, coffee and other insulated cups, etc.

In various exemplary embodiments, cap 100 comprises a housing 104 that connects to the beverage container and that may be made from a single piece or assembled from two or more component parts. Housing 104 may include a handle 106 extending outward from the housing to allow the user to easily carry the beverage container by hooking it through one or more fingers or by attaching it to a garment or bag by a hook or other connector such as a carabiner. Housing 104 may also include a valve button 108 that can be actuated by pressing it inward relative to the outer surface of the housing 104 to open a valve 110 and allow the beverage in the container to flow out of the opening 112. In various exemplary embodiments, handle 106 extends from the housing 104 at a location above and adjacent to the valve button 108 to provide a stable structure for the user's hand to securely grasp the beverage container and cap 100 when the valve button 108 is actuated.

The beverage in the container attached to the cap 100 flows from opening 112 when valve 110 is opened. In an exemplary embodiment of the invention, opening 112 is located near the periphery of a top surface 114 of the housing 104. In various embodiments, top surface 114 may take any shape and may be contoured to manage the flow of liquids that escape from the opening 112. In an exemplary embodiment as shown in the accompanying drawings, top surface 114 can be sloped back and away from opening 112 and slightly down to the sides to prevent accumulation of fluids and to direct the flow of any fluids that leak from the opening 112 away from the user. By positioning the opening as shown on the top surface 114, the taper and angle provide for a proper mouth fit for easy drinking, with no place for fluids to collect.

In an exemplary embodiment of the invention, valve button 108 is located on a side surface of the housing 104. Valve button 108 is actuated by the user by depressing it inwardly relative to the side surface of housing 104. As shown in the accompanying drawings, in an exemplary embodiment of the invention valve button 108 is located on the side surface of housing 104 generally opposite the peripheral location of opening 112. In this location, one or more of the user's fingers will naturally land on the valve button 108 when the beverage container is grasped and raised the user's mouth. Handle 106 can also be arranged such that the user's finger will naturally be positioned on the valve button 108 when the user grasps the beverage container. In various exemplary embodiments, handle 106 extends out and up from the edge of the top surface 114 of the housing 104 at a location above and adjacent to the valve button 108 at an angle of 15-25 degrees from horizontal. This location and upward angle allows for a comfortable, secure grip that naturally places the user's index finger directly on the valve button 108 so that the valve can be operated while maintaining a secure grip on the beverage container.

Valve button 108 may be contoured to naturally engage the user's finger so that it can be easily depressed by pressure from the user's finger. Housing 104 may also include a gripping area 116 on the side surface of housing 104 adjacent to opening 112 where the user's thumb will naturally land when the beverage container is grasped for use. Gripping area 116 may be contoured or provided with a surface that improves frictional engagement by the user's thumb.

In an exemplary embodiment of the invention, housing 104 includes a clip 118 that extends downward from lower periphery of housing 104 and can be slipped over a belt or other strap, or into a pocket on a garment or bag to securely hold the beverage container. Clip 118 may be contoured to improve engagement with such structures. In an exemplary embodiment, the inner surface of clip 118 is concave to provide for secure engagement when used with a belt or in a pocket. Some or all of clip 118 may also be contoured or may be comprised of a material that improves frictional engagement such as an elastomeric material or coating.

In an exemplary embodiment of the invention, valve button 108 can be depressed into a valve button cavity 120 extending into the housing 104. Valve button 108 may include a valve button shaft 122 or other extension that extends through an aperture 124 in the valve button cavity 120 into the interior of housing 104. Valve button 108 may be biased outward by springs 126 or any other suitable biasing mechanism. In an exemplary embodiment, a button shaft seal 128 seals the aperture 124 and may retain the valve button shaft 122 to retain the valve button 108 in the valve button cavity 120. In various embodiments, other mechanisms such as elastomeric seals or molded stops can be use to retain the valve button 108 in the valve button cavity 120.

In an exemplary embodiment of the invention, valve button shaft 122 is attached to valve seal actuator 130. The valve seal actuator 130 is located inside housing 104, and in its resting position may be adjacent to the valve button cavity 120. The valve seal actuator 130 may help retain the valve button 108 in the valve button cavity 120.

In various exemplary embodiments of the invention, valve seal 132 comprises an elastomeric material that is preferably a food-grade material such as silicone. Other elastomeric materials such as thermoplastic elastomers or similar materials that can maintain their shape over time may also be appropriate. Valve seal 132 may take any suitable shape and be placed in a suitable location that allows it to be retained within housing 104 in a resting position where it seals off fluid flow from opening 112. In various exemplary embodiments, valve seal 132 is slightly loaded such that it is biased against the internal top surface of the housing 104 in the region of the opening 112 to seal the opening 112. By mounting the valve seal 132 under a slight load, the valve seal 132 uses the spring force of the elastomer itself to achieve and maintain a seal, thus eliminating the need for a separate biasing mechanism.

In an exemplary embodiment of the invention, valve seal 132 has a generally U-shaped profile with a generally vertical actuating side 134, a sealing side 136 that matches the interior contours of the housing 104 in the area of opening 112, and a generally vertical anchor side 138 that may be contoured to match the shape of the interior side of the housing 104 or other adjacent surface. The actuating side 134 is disposed toward the interior of the housing 104 and the anchor side 138 is adjacent to the housing 104 or another surface or feature that maintains the anchor side in a fixed position. At rest, the sealing side 136 is in contact with inner side of the top surface 114 of the housing 104 and may be under a slight load such that it completely covers and seals the opening 112. In an exemplary embodiment, a seal mounting plate 140 is affixed to housing 104 and the valve seal 132 is seated in the seal mounting plate 140, holding the valve seal 132 in position within the housing 104. In an exemplary embodiment of the invention, an appropriate load on the valve seal 132 can be achieved by positioning seal mounting plate 140 relative to the interior of top surface 114 of housing 104 so that the valve seal 132 is compressed in the range of 20 to 30 thousandths of an inch.

Figure 4A:
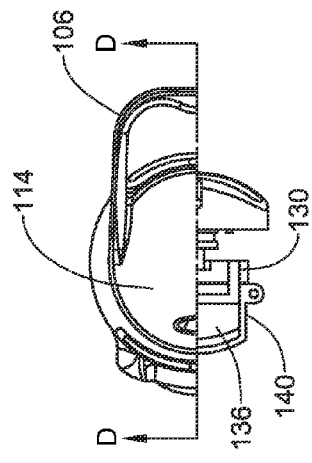
FIG. 4A is a top view of an exemplary embodiment of a container cap in accordance with the present invention.
Figure 4B:
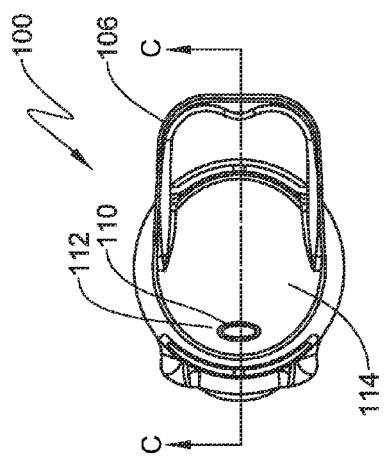
FIG. 4B is a partial section top view of an exemplary embodiment of a container cap in accordance with the present invention.
Figure 4C:
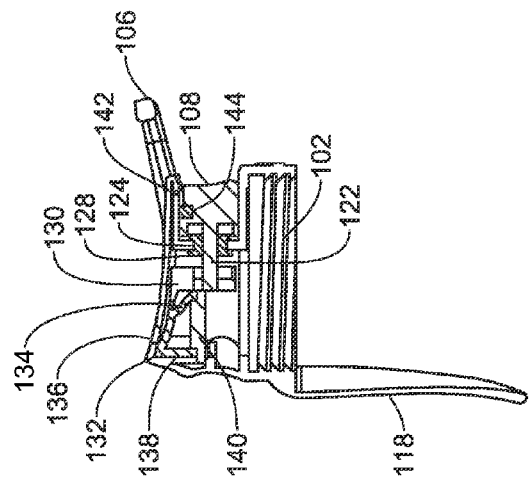
FIG. 4C is a section C-C side view of an exemplary embodiment of a container cap in accordance with the present invention with the valve closed.
Figure 4D:
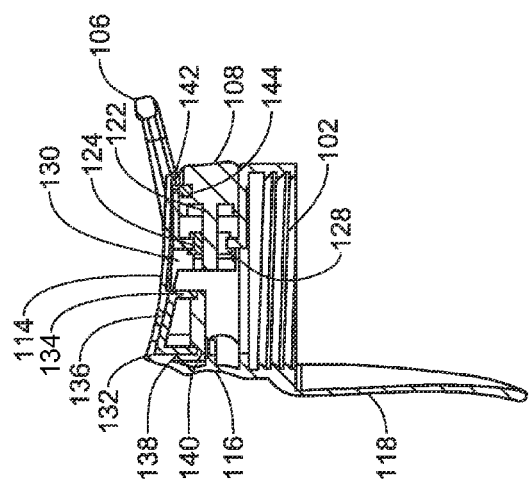
FIG. 4D is a section D-D side view of an exemplary embodiment of a container cap in accordance with the present invention with the valve open.
Figure 5:
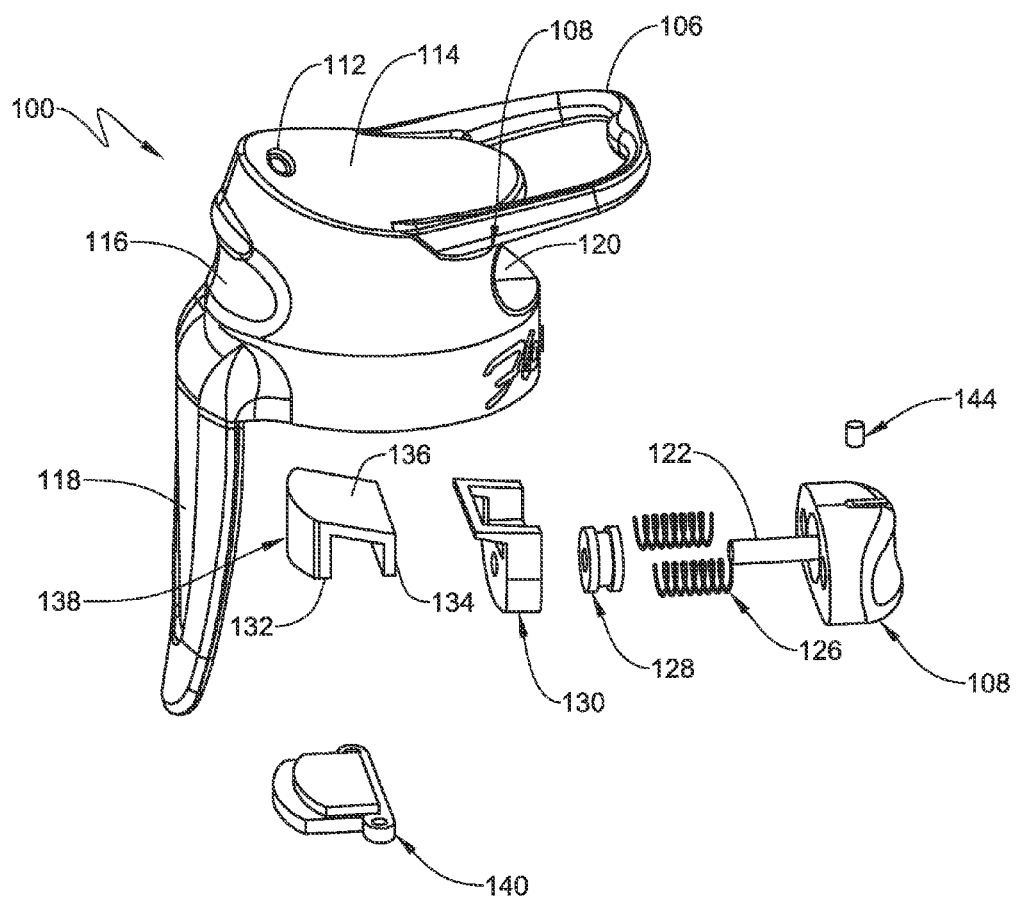
FIG. 5 is an exploded view of an exemplary embodiment of a container cap in accordance with the present invention.
Figure 6:
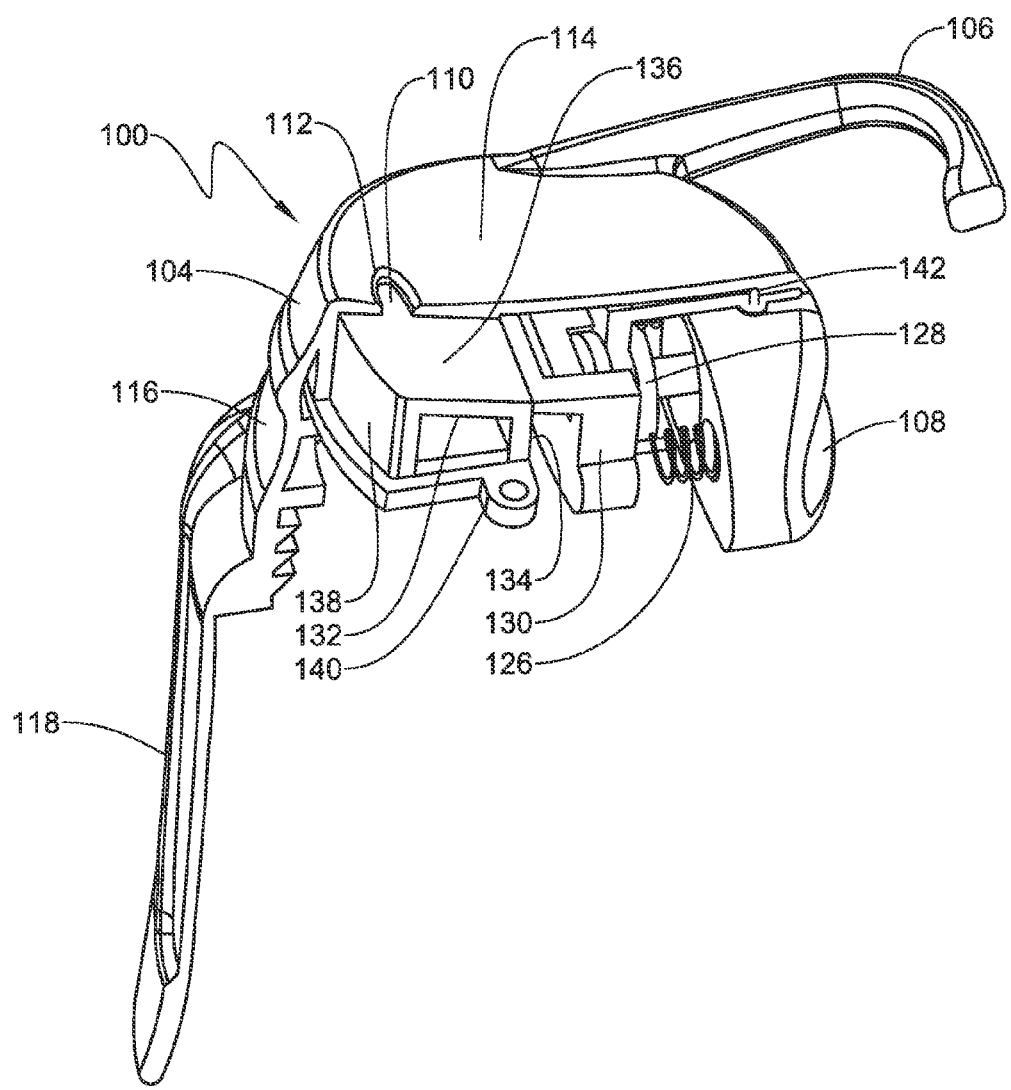
FIG. 6 is a perspective partial section view of an exemplary embodiment of a container cap in accordance with the present invention.
Figure 7:
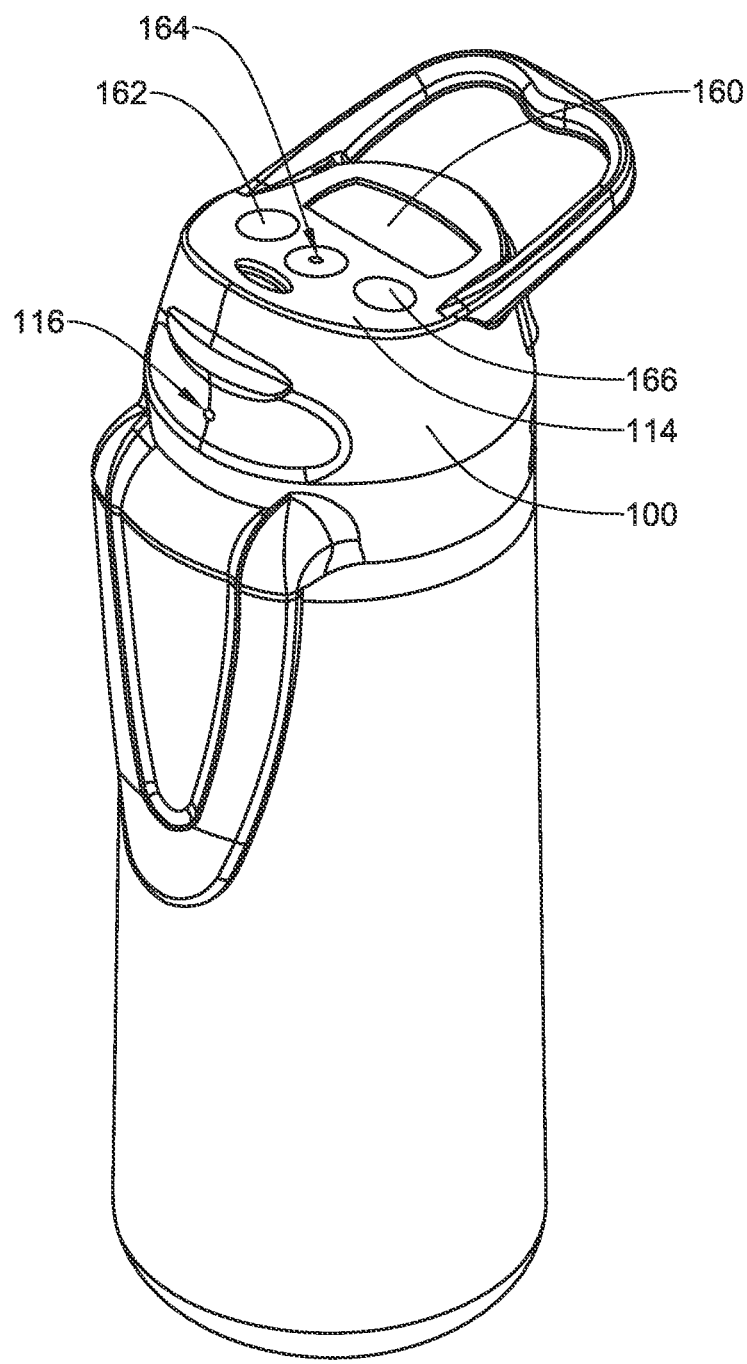
FIG. 7 is a perspective view of an exemplary embodiment of a container cap in accordance with the present invention attached to a bottle.
Figure 9:
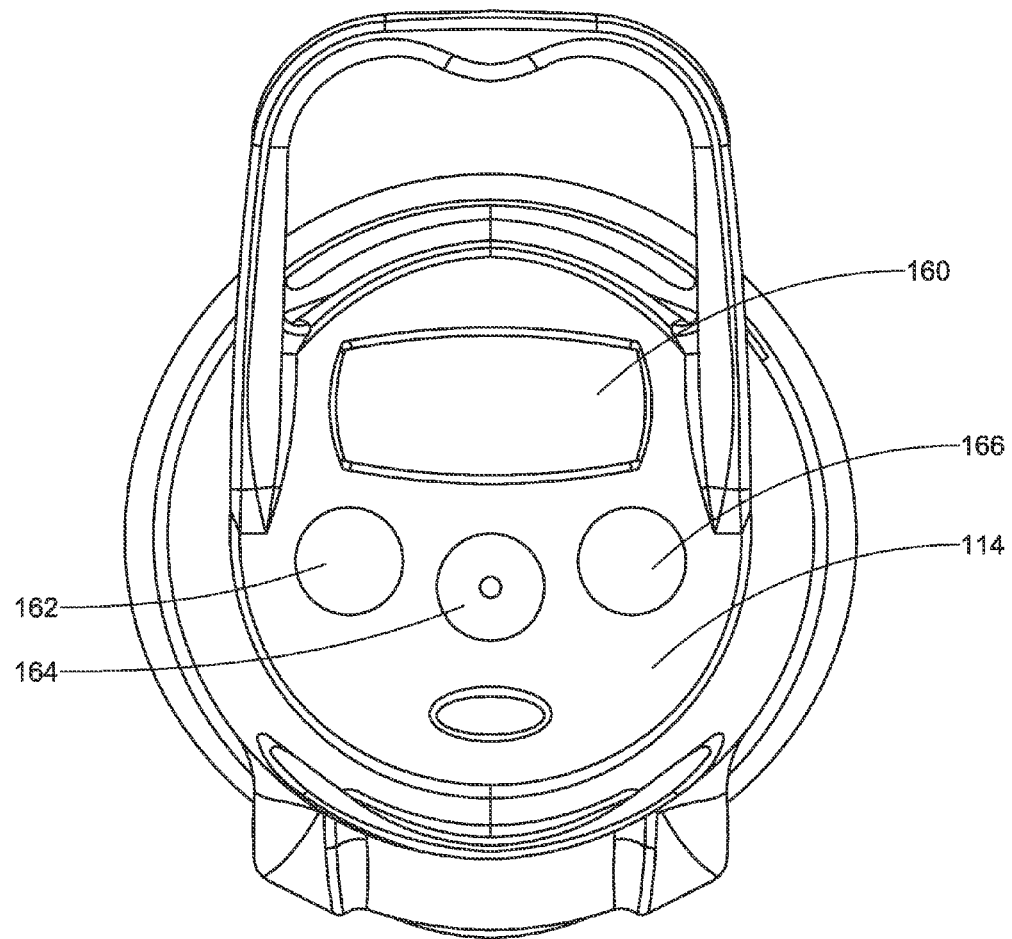
FIG. 9 is a top view of an exemplary embodiment of a container cap in accordance with the present invention.

In various exemplary embodiments of the invention, the valve seal 132 seals the opening 112 in the resting position but can be deformed by a force exerted by valve actuator 130 such that it no longer seals the opening 112. Referring to valve sections C-C (closed) and D-D (open) shown in FIGS. 4C and 4D, in an exemplary embodiment of the invention, when the valve button 108 is depressed into the valve button cavity 120, valve actuator 130 is forced in a lateral direction such that a portion of the valve actuator 130 exerts a force on the actuating side 134 of the valve seal 132. This force on the actuating side 134 of the valve seal 132 causes the valve seal 132 to elastically deform away from the opening 112. As long as a fluid path is maintained from the beverage container through the housing 104 to the opening 112, the beverage can be dispensed through opening 112.

The valve actuator 130 can be configured using a wide range of geometries to allow for a fluid path through the housing 104 to the opening 112. In one exemplary embodiment, valve actuator 130 has a main body that extends in a generally vertical direction and that is attached to the valve button shaft 122 such that it moves in a lateral direction when the valve button 108 is pressed by the user. The valve actuator has a generally U-shaped section that extends laterally to a point adjacent to or in contact with the valve seal 132 on the upper portion of the actuating side 134 in the resting position with the valve closed. A large aperture extends through the valve actuator 130 below and the in the area of the generally U-shaped lateral extension, which allows fluid to easily pass through the valve actuator. When the valve button 108 is pressed by the user, the valve actuator 130 moves laterally such that the generally U-shaped lateral extension exerts a lateral force on the upper portion of the actuating side 134 of the valve seal 132, deforming the valve seal 132 to overcome the sealing bias, and separating the sealing side 136 from the inner surface of the top of the housing 104 and opening 112. The opening 112 is then open to fluid flowing from the beverage container through the aperture in the valve actuator 130.

It will be readily understood by those skilled in the art that the arrangement and geometries of the various valve components described herein can be varied to achieve the same result of a deformable, elastomeric valve seal. For example, the geometry and mounting of the valve seal 132 can be changed in a variety of ways that still use the spring force of the elastomer itself to achieve and maintain a seal. Similarly, the geometry and mounting of the valve actuator 130 can be changed in a variety of ways that achieve the necessary deformation of the valve seal 132 while allowing a fluid path from the beverage container to the opening 112 when the valve is open.

In various exemplary embodiments of the invention, the valve button cavity 120 is sealed such that the valve button 108 and the biasing springs 126 or other button biasing mechanism do not come in contact with the contents of the beverage container and are kept clean and dry. Because the exposed parts disposed within the interior of the housing 104 are firmly attached and made of a suitable elastomer or other durable material, this allows the entire cap 100 to be completely immersed in water for cleaning by hand or in a dishwashing machine. The simplicity of the design allows for the cap to be made so that it is microwave safe.

In various exemplary embodiments, an air vent can be provided in the housing 104 to provide for free fluid flow through the opening 112. In an exemplary embodiment, an air vent 142 is located in button cavity 120 and can be provided with an air vent seal 144 to prevent the unintentional release of fluids from the air vent 142. This location improves the aesthetics of the beverage cap by placing the air vent 142 in a location where it cannot be seen. In an exemplary embodiment, air vent seal 144 is affixed to valve button 108 and positioned such that it seals the air vent 142 in the resting position when the valve is closed, but then moves laterally so that the air vent 142 is open when the valve button 108 is pressed by the user and the valve is opened. In this arrangement, the air vent seal 144 and the valve seal 132 are both actuated by pressure on the valve button 108, such that both are actuated simultaneously so that the fluid can flow freely to the opening 112.

In various exemplary embodiments, the housing 104 can provide a cavity 150 for mounting decorative items, instruments such as a compass or altimeter, or informational devices such as display screens. In various exemplary embodiments, the beverage container cap can be equipped with one or more digital processors, storage devices, output devices, sensors, accelerometers, gyroscopes, GPS systems, pedometers, physiological monitors, thermometers, etc. that provide information that can be output to the user via a display mounted in cavity 150. Sensors can be placed at appropriate locations throughout the housing including the valve button 108 and gripping area 116 where the user's hands naturally grip the cap during use. Systems can be provided to measure, store, and display instantly or over time the user's heartrate, respiration rate, blood pressure, blood oxygen level, hydration or any other physiological characteristics. Systems can also be provided to measure, calculate, store, and display instantly or over time trip, location, and activity information such as physical location, temperature, humidity, barometric pressure, time, elapsed time, number of steps, alarms, altitude, etc.

In various exemplary embodiments the cap 100 can be fitted with a display device 160 such as an LCD screen to display information to the user. Where an appropriate cavity 150 is provided, the screen may be positioned on the top surface 114 of the cap 100 so that it can be easily seen by the user. Various controls can be positioned at appropriate locations on the cap 100 to select the information to be displayed on display device 160. In various exemplary embodiments control buttons 162, 164, 166, can be provided, or the display screen 160 may be a touchscreen with controls that are activated by the user's touch or gesture.

In various exemplary embodiments, digital storage, processing, and communications can be provided to manage data collected by such systems. Communications such as Bluetooth, WiFi, WAN, NFC, cellular, etc. to allow the system to communicate with smartphones, laptops, networks, cloud-based systems, etc. to transfer, exchange, or receive information for storage or display to the user. Such systems would allow the user to transfer information gathered during their activities for storage and use without the need to carry any additional electronic devices. For example, a cap could be equipped with sensors that gather basic physical information such as heartrate, respiration rate, blood pressure, blood oxygen level and hydration levels. This information can be stored and/or displayed to the user via a display device 160 located in cavity 150, and transferred to a remote system for storage, compilation, analysis and display on a different device such as a smartphone, tablet, or other computer. The system can be controlled by any appropriate user interface mounted in the housing such as a touchscreen, buttons, or other user input devices.

As indicated above, wide range if different sensors may be used to gather information relevant to the user. In various exemplary embodiments, a probe 170 or sensor may extend into the container 172 that measures the quantity of fluid in the container 172. Such a device could measure the fluid level using a capacitance probe, a resistance probe, an ultrasonic sensor, an optical sensor, a mechanical float, a pressure sensor, or any other technique. A processor can then use the fluid level measurement to determine the quantity of fluid that has been consumed over time. The system can then display the quantity of fluid consumed by the user on display device 160. The probe can extend from the cap into the container 172, or can be built-in or attached directly to the container 172 itself and feed data to the cap or device for display to the user.

The user's heart rate can be measured and displayed to the user on display device 160. Heart rate can be detected by measuring electrical signals between two locations on the users body, such as between the two hands or between one hand and another part of the body, between two fingers, or even between two points on one finger. Heart rate can also be detected using optical sensors that measure the relative amount of light transmitted through a finger or thumb, or by any other technique that may be developed. Heart rate sensor electrodes can be provided on the valve button 108 and gripping area 116 where the user's hands naturally grip the cap during use, or on one or more of the control buttons 162, 164, 166, or at any other locations on the cap 100 or container 172.

The user's step count can similarly be measured and displayed to the user on the display device 160. Step count can be measured using an electronic accelerometer of any type, mechanically such as using a weighted spring that contacts a switch, flexes a piezo membrane, or flexes a strain gauge, a vibration sensor, or by any other suitable means in the cap 100 or container 172.

In various exemplary embodiments a range of different information can be sensed and displayed to the user. For example, control buttons 162, 164, 166 could be used to display heart rate, fluid consumption, and step count respectively, or similar controls could be accessed via a touchscreen display. Display controls can be programmed to display any available information to the user via display device 160.

In various exemplary embodiments, the valve mechanism is designed to preserve open volume below the top surface 114 of housing 104 in the area opposite opening 112 such that cavity 150 can be positioned in the best possible location to be viewed by the user without the need to increase the size or volume of the housing 104. In an exemplary embodiment of the invention, the valve actuator has a generally U-shaped section that extends laterally to a point adjacent to or in contact with the valve seal 132 on the upper portion of the actuating side 134 in the resting position with the valve closed as described above to maintain space for cavity 150 in the best location within housing 104.

In various exemplary embodiments the cap may include a measurement device and display that can inform the user how much fluid has been dispensed from the beverage container over a specified period of time such as a day. The cap may be equipped with any type of flow meter, measurement, or estimation system to determine or estimate how much fluid has been dispensed, and a display such as is described above to inform the user of this information.

Figure 10:
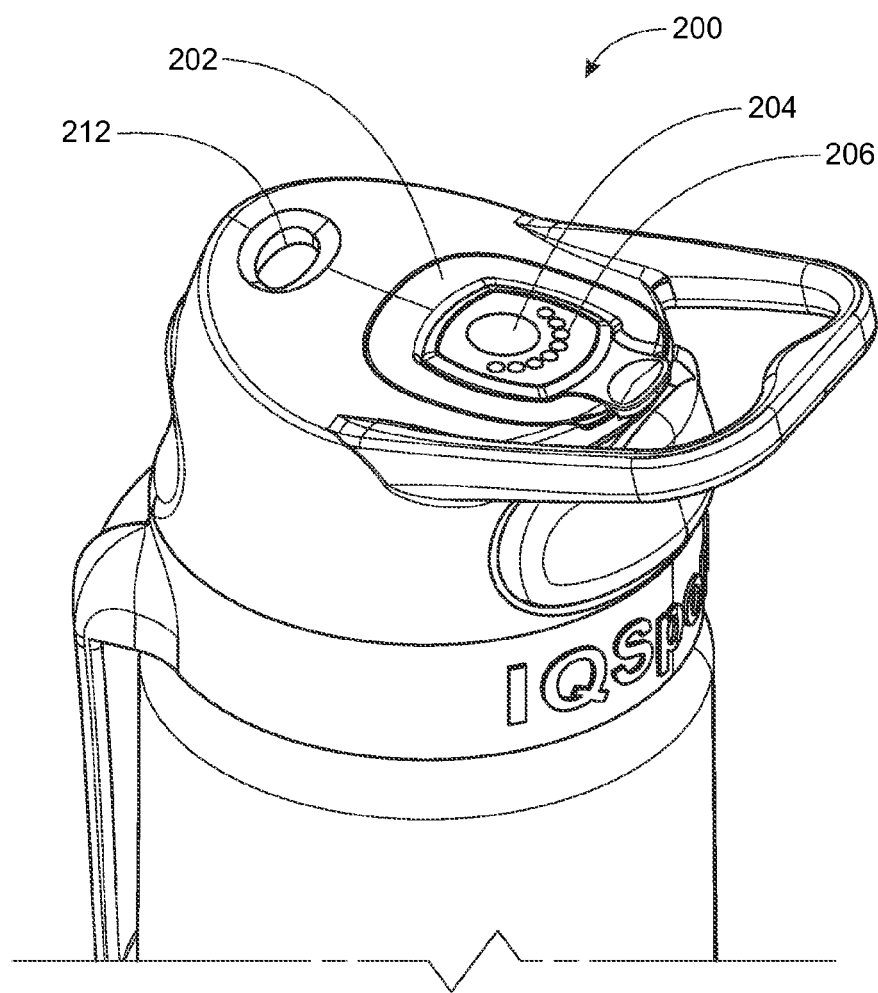
FIG. 10 is perspective view of an exemplary embodiment of a container cap in accordance with the present invention.

Referring to FIG. 10, in various exemplary embodiments, a cap 200 can be equipped with a display housing 202 containing a control button 204 and a plurality of small indicator lights 206. The control button can be used to reset the display or program it to output different information. The indicator lights can be used to indicate the amount of fluid that has been dispensed since the last reset, or over a particular period of time such as a day or a week, by sequentially lighting up as additional fluid is dispensed. Such a system can be designed to automatically reset at a certain time interval, such as every day. This allows the user to quickly determine how much fluid they have consumed. In various exemplary embodiments, the indicator lights may be replaced with an LED display, an LCD display, bar graphs, numerical outputs, etc.

In various exemplary embodiments, the electronics housing can be detachable so that the cap can be cleaned in the dishwasher. As discussed above, in various exemplary embodiments, digital storage, processing, and communications can be provided to manage data collected by such systems. Communications such as Bluetooth, WiFi, WAN, NFC, cellular, etc. to allow the system to communicate with smartphones, laptops, networks, cloud-based systems, etc. to transfer, exchange, or receive information for storage or display to the user. Such systems would allow the user to transfer information gathered during their activities for storage and use without the need to carry any additional electronic devices.

In various exemplary embodiments, the amount of fluid that has been dispensed from the beverage container can be determined or estimated using a variety of different techniques and devices. In one exemplary embodiment, an electronic switch can be placed in parallel with the water valve located in the cap so that when the valve is activated, the switch is opened or closed. The switch can be connected to a timer that tracks the amount of time the water valve is kept open, which in turn can be used to calculate the amount of fluid dispensed based on the average flow rate through the opening 212.

A more accurate estimate may be obtained by including a sensor that can determine when the beverage container is tilted. The sensor could be oriented so that it activates when the beverage container is tilted into the drinking orientation such that the timer would only be activated when the beverage container was in position to dispense the fluid. Further accuracy may be obtained by the use of a small probe to sense the presence of fluid near the opening 212, such that the time would only be activated when fluid is present near the opening. An additional water sensor could be placed near the top of the beverage container to differentiate between sipping (lower water level) and pouring out at maximum flow (higher water level). Two separate timers and a conversion could be used to further increase the accuracy of the estimated consumption.

In various exemplary embodiments, a direct flow measurement device could be installed inline to precisely measure the actual flow of fluid out of the beverage container.

What is claimed is:

1. A cap for use with a beverage container comprising:
   a housing that attaches to the beverage container, the housing comprising an opening that dispenses contents of the beverage container and further comprising a valve activated by a valve button;
   a sensor located within the housing to estimate the amount of a fluid that has been dispensed from the opening;
   a display device that displays the amount of fluid that has been dispensed from the opening; and
   wherein said sensor further comprises a tilt switch within the housing.

2. The cap of claim 1, wherein the display device is an LED display.

3. The cap of claim 1, wherein the display device is an LCD display.

4. The cap of claim 1, wherein the display device is a plurality of indicator lights.

5. The cap of claim 1, wherein the tilt sensor activates a timer only when the beverage container is tilted in an orientation for drinking.

6. The cap of claim 1, wherein the sensor located within the housing is a switch that is opened or closed when the valve is activated.

7. The cap of claim 6, further comprising a timer controlled by the switch to determine an amount of time the valve is activated.

8. The cap of claim 7, wherein the amount of fluid that has been dispensed from the beverage container is determined based on the amount of time the valve is activated and an average flow rate out of the opening of the cap.

9. A cap for use with a beverage container comprising:
- a housing that attaches to the beverage container, the housing comprising an opening that dispenses contents of the beverage container and further comprising a valve activated by a valve button;
- a sensor located within the housing to estimate the amount of a fluid that has been dispensed from the opening,
    - wherein the sensor located within the housing is a switch that is opened or closed when the valve is activated; and,
- a display device that displays the amount of fluid that has been dispensed from the opening.

10. The cap of claim 9, further comprising a timer controlled by the switch to determine an amount of time the valve is activated.

11. The cap of claim 10, wherein the amount of fluid that has been dispensed from the beverage container is determined based on the amount of time the valve is activated and an average flow rate out of the opening of the cap.

12. The cap of claim 9, wherein the display device is an LED display.

13. The cap of claim 9, wherein the display device is an LCD display.

14. The cap of claim 9, wherein the display device is a plurality of indicator lights.

\* \* \* \* \*